Figures 1, 2, 3:
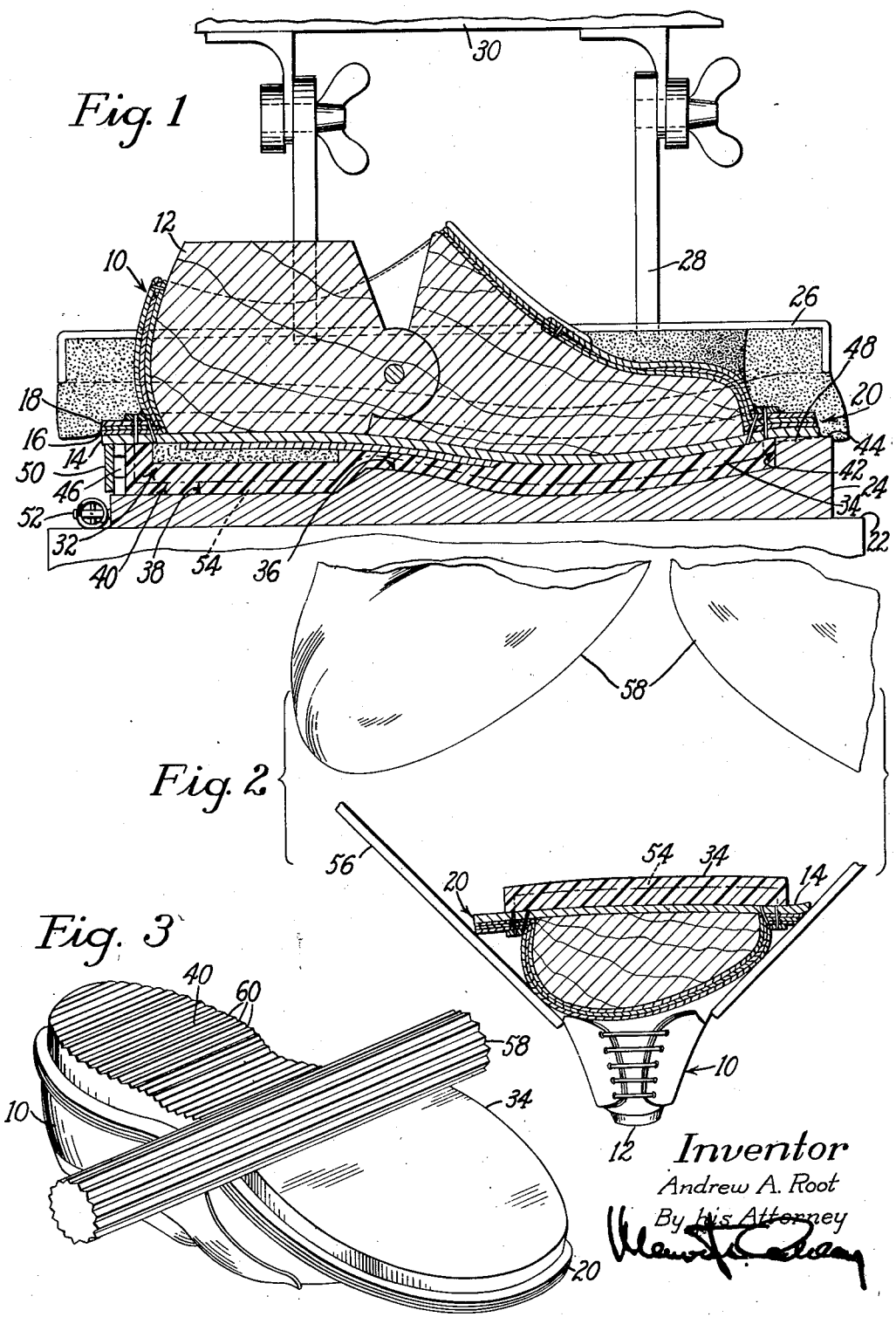

Inventor  
Andrew A. Root  
By his Attorney

Patented May 19, 1953

2,638,633

UNITED STATES PATENT OFFICE 2,638,633

MOLDING OF RESIN DISPERSIONS

Andrew A. Root, Salem, Mass., assignor to United Shoe Machinery Corporation, Flemington, N. J., a corporation of New Jersey Application September 8, 1949, Serial No. 114,630

6 Claims. (Cl. 18—59)

This invention relates to a method for molding a body of plastic on the surface of an article and particularly to an improved method of forming a sole on a shoe.

It has been proposed to mold a sole on the bottom of a shoe by a method involving placing "biscuits" or preforms of unvulcanized rubber in a mold and pressing the shoe firmly against the upper face of the mold to form a molding chamber. The mold and rubber were heated and the rubber material was conformed to the shape of the mold, bonded to the bottom of the shoe and vulcanized.

The vulcanization of a sole on an upper involves numerous technical difficulties and economic disadvantages; and in my copending application, Serial No. 56,886, filed October 27, 1948, I have disclosed a pressureless method for molding a plastic, wear-resistant sole on a shoe which avoids many of the difficulties present in the vulcanization method of sole molding. In that method there is confined between the bottom of an article of footwear, such as a shoe, and a molding surface, a body of a fluid dispersion of resin particles in a liquid plasticizer having no substantial solvent action on the resin when cool. This fluid dispersion is then caused to set up to a firm, resilient condition in which it reproduces the molding surface and is firmly bonded to the bottom of the shoe by heating it to effect at least partial solution of the resin and plasticizer. This method gives excellent results; but it requires a substantial period of heating of the resin dispersion in the mold so that for the manufacture of a substantial number of shoes a large number of molds will be required.

It is a feature of the present invention to provide an improved method for molding a wear-resistant sole on a shoe whereby the time during which the shoe and mold are maintained in cooperative relation is substantially reduced.

In accordance with the present invention a shaped body of plastic is formed on the surface of an article by confining between the surface of the article and a molding surface a body of fluid paste dispersion of resin particles in a liquid plasticizer having no substantial solvent action on the resin when cool but capable of at least partly dissolving the resin when heated. Heat is supplied through the molding surface to convert portions of the fluid dispersion adjacent it to a firm resilient condition reproducing the configuration of the molding surface and adhering firmly to the article to provide a shape-retaining shell confining the unsolidified portion of the dispersion against the surface of the article. The article and adhering shell with fluid resin dispersion therein are removed from engagement with the molding surface, and the remaining fluid resin dispersion is solidified by further application of heat away from contact with the molding surface. If desired, the surface of the solidified resin while in softened condition from the further heating or from a reheating may be formed further by pressing it lightly with a shaped surface.

The invention will be further described in connection with the accompanying drawings forming part of the present disclosure. In the drawings, Fig. 1 is a sectional elevation of a shoe mounted on a last and held in cooperative relationship with a heated mold by a press;

Fig. 2 is a sectional elevation of a shoe on a last with a solidified resin shell and unsolidified resin within the shell on the bottom of the shoe, and heat lamps disposed to heat the sole further; and Fig. 3 is a perspective of a shoe mounted on a last and of a shaped surface being applied to the sole of the shoe to produce a desired configuration on the sole of the shoe.

In practicing the method of the present invention, an article, such as a shoe 10, is prepared and mounted on a suitable form such as a last 12 which will retain it in shaped condition for molding of a sole thereon. The shoe 10 illustrated in the figures is a conventional stitchdown shoe having an insole 14 but not having a conventional outer sole. The lower edges 16 of the shoe are flared outward and staple or thread lasted to the insole 14. Welting 18 is applied to the flared edges 16 of the upper, and the welting 18, flared edges 16 and insole 14 are stitched together to provide a flange 20.

The bottom of the shoe 10, in this case the bottom of the insole 14, may then be coated or lightly impregnated with a thinly fluid, resinous material, suitably a resin latex. A suitable resin latex is a 54.6% solids polyvinyl chloride latex. Other aqueous dispersions or latices of resins compatible with the resin to be molded on the shoe may be used. When the bottom surface of the shoe has been treated with the resinous material, it is dried if necessary and is then ready for the molding operation. This coating or impregnating treatment improves the bond between the shoe and a sole molded thereon but may be omitted.

An apparatus adapted for forming a sole on a shoe having a flange or welt around its bottom edge is illustrated in Fig. 1 and comprises a heated surface 22, a heat conducting mold 24 thereon, and an articulated retaining ring 26 supported by a frame 28 which is connected to the transverse beam 30 of a press. The mold 24 comprises a block of metal having a flat bottom so that it is heated efficiently by the heated surface and having a shaped recess 32 therein, the shape of the recess corresponding to the shape of the shoe sole 34 which it is to form. The bottom surface 36 of the recess may be plain or may be shaped at its forward portion to form a desired sole pattern on material molded therein. The rear portion 38 of the recess is depressed below the general level of the forward portion for molding a heel portion 40 integral with the sole. The surface of the rear portion may also, if desired, be formed to provide a desired tread pattern on the tread portion of the heel. The sides 42 of the recess 32 extend up from the bottom surface 36 for a distance corresponding to the desired thickness of the sole 34 to be molded. Soles of any desired thickness ranging from as little as $\frac{3}{32}''$ up to any desired value may be molded by the method of the present invention. The term "substantial thickness" is used herein to describe soles within this range.

The shoe 10 mounted on a last 12 is disposed within the pressure ring 26 with the edges of the ring against the flange 20 around the edge of the shoe. The ring 26 is then pressed down to force the flange 20 into sealing engagement with the upper surface 44 of the mold in alinement with the recess of the mold. Fluid or pasty resin dispersion is introduced into the space defined by the bottom of the shoe upper, i. e., bottom of the insole 14, and the mold surfaces through a conduit 46 which is illustrated as being disposed in the heel portion 40 of the mold. The resin dispersion is supplied until the mold is completely filled as evidenced by escape of resin from the narrow groove 48 in the toe portion of the upper surface 44 of the mold. The supply of dispersion is then cut off and the closure slide 50 is forced across the opening at the end of the conduit 46 by the spring 52 to prevent loss of dispersion from the mold.

The assembly of shoe and heated mold containing the resin dispersion is permitted to stand for a period sufficient to solidify those portions of the resin dispersion adjacent the mold to a thickness such that it forms a shape-retaining shell. The boundary between the solidified material and the fluid material is not sharp, but shell thicknesses of from $\frac{1}{16}''$ to $\frac{5}{32}''$ have been found satisfactory. The solidified portions of the dispersion form a shell 54 around the unsolidified portions of the dispersion and also adhere firmly to the portions of the shoe adjacent the mold. The shoe 10 and adhering shell 54 containing the unsolidified dispersion are then removed from engagement with the mold by raising the pressure ring and lifting the shoe 10 and solidified shell 54 out of the recess 34 in the mold 24.

The shoe 10 and adhering shell 54 are then placed bottom upward on a conveyor 56 and moved beneath a bank of infra-red lamps 58 disposed to apply heat to the shell 54 as the shoe is carried along. The remaining portions of the resin dispersion within the shell are solidified by the subjection to the infra-red heating for a period of from four to twelve minutes and form with the shell a uniform, homogeneous resin sole 34 firmly adhering to the bottom of the shoe.

Resin dispersions employed in the method and article of the present invention are liquid to pasty mixtures of from 30% to 70% of thermoplastic resin particles in from 70% to 30% of a liquid plasticizer having no substantial solvent action on the resin when cool, but capable of combining physically with the resin particles when the dispersion is heated to form a uniform mass of plasticizer resin. The relative proportions of resin and plasticizer selected will depend on the physical properties desired in the final tread surface. For example, high proportions of plasticizer relative to the proportion of resin will give a softer more rubbery sole than lower relative proportions within the range.

The particle size of the dispersed resin may vary within relatively wide limits. However, particles of from 275 to 325 microns have been found very satisfactory.

Resin dispersions which have been found particularly satisfactory in the process of the present invention include: a dispersion of particles of a copolymer of vinyl chloride and vinyl acetate containing from 85% to 88% of vinyl chloride in a substantially equal quantity by weight of dioctyl-phthalate; a dispersion of 50 parts of particles of a vinyl chloride, vinyl acetate copolymer containing 85% to 88% of vinyl chloride, in 45 parts of dioctyl-phthalate; and a dispersion of 50 parts of a vinyl chloride, vinyl acetate copolymer, and 49 parts of an ester type plasticizer which may be tri-cresyl phosphate, dibutyl phthalate or dioctyl phthalate. Dispersions of other resins, including polymethyl methacrylate and vinyl chloride-vinylidene chloride copolymers in plasticizers in which they are not substantially soluble in cold condition and in which they are dissolved or gelled when heated, may be employed, provided the resin body obtained on heating the resin dispersion possesses the toughness, hardness and resilience to render it suitable for its intended use.

It has been found desirable in dispersions of the type employed to use about 1% of a conventional stabilizer.

Limited amounts of fillers may be incorporated in the dispersion prior to molding. Fillers which have been employed include fibers of copolymerized vinyl chloride and vinyl acetate, sisal fiber, diatomaceous earth and clay. Other fillers may be used. The percentage of fillers will depend on the stiffness, strength, or other property desired and may be as much as 50% on a volume basis, preferably about 25%.

The dispersion may also include any compatible dye or pigment or combination of these. Where pigment is used it may first be ground into the plasticizer.

With a resin dispersion comprising a copolymer of vinyl chloride and vinyl acetate containing from 85% to 88% of vinyl chloride in a substantially equal quantity by weight of dioctyl-phthalate and using a mold temperature of 270° to 325° C., a shape-retaining shell of solidified dispersion adhering firmly to the shoe is formed in a heating period of approximately one minute. With hotter molds, a satisfactory shell may be formed in as little as 40 seconds. Heating periods of greater length than one minute may of course be employed. Longer periods of heating in the molds reduce the number of shoes on which soles can be molded in a given period of time with a given number of molds.

Using infra-red radiation units, for example 375 watt infra-red lamps, spaced at a distance of about 6 to 12 inches from the surface of the soles of shoes carried by the conveyor, and with centers spaced a distance of about 8 to 12 inches apart on a line parallel to the direction of the conveyor, it is found that the further or secondary heating period may be from 4 to 12 minutes to form a sole surface which is solid throughout and firmly adherent to the shoe.

As an alternative to the infra-red lamp heating treatment for the further or secondary heating of the shoes, other types of heating such as oven heating, or the action of a high-frequency electric field on the dispersion, may be employed to provide the heat necessary to solidify the fluid portions of the dispersion. In a high-frequency electric field of 1800 volts and a frequency of from 20 to 40 megacycles created between electrodes disposed at opposite edges of the soles, satisfactory heating may be obtained in as short a period as 30 seconds to 2 minutes. For oven heating, the entire assembly of shoe and shell with unsolidified dispersion may be placed in an oven at a temperature from 310° F. to 375° F. for a period of from 8 to 30 minutes to cause the remainder of the dispersion to solidify.

The bottom surface of the molded sole in heated condition as it comes from the step of solidifying the dispersion within the shell, or from a reheating if the sole has been permitted to cool after solidification, may be further formed by a suitable contoured surface. As illustrated in Fig. 3, this surface may be a fluted roll 58 which is rolled with light pressure, e. g., pressure such as may easily be applied by a workman moving the roller over the surface of the sole. The surface of the sole is given a surface contour such as the transverse corrugations 60 complementary to the contour of the roll. This contoured surface provides excellent gripping action to a variety of surfaces. It will be observed that molds having smooth bottom portions may be employed for the shell forming operation and thereafter any desired contour may be provided on the bottom of the sole. Molds having plain surfaces are much less expensive to manufacture than soles having contoured bottoms. Also, the expedient of afterforming the soles allows a wide variety of sole patterns to be made with shoes from a given set of molds.

The process of the present invention is extremely flexible and lends itself to the manufacture of widely varied types of shoes. Thus, soles and/or heels may be molded on shoes of any type including welt, stitchdown, McKay, pre-welt, slip lasted, Littleway or other shoe construction, and may be formed on fabric footwear such as slippers or even on socks. The resin dispersion is fluid and enters readily into all portions of even the most complicated mold designs. Also the pressureless character of the molding operation simplifies operating procedure as well as mold design so that many variations may be introduced into the process. For example, mechanical inserts may be employed without complicated arrangements for retaining them in position as might be required in pressure molding operations.

Having thus described my invention, what I claim as new and desire to secure by Letters Patent of the United States is:

1. The method of providing a molded member of substantial thickness on a surface of an article which comprises bringing together the article and a molding surface to provide between the surface of the article and the molding surface a confined space of substantial thickness, supplying to the space a body of a fluid paste dispersion of resin particles, supplying heat to said body through said molding surface, maintaining the article and dispersion in contact with said molding surface to solidify the portion of the dispersion adjacent the molding surface to a depth such that it forms a shape-retaining shell confining the unsolidified portion of the dispersion against the surface of the article and the solidified material of the shell bonds itself firmly to the portions of the article adjacent the molding surface, removing the article together with the adhering solidified shell and unsolidified dispersion within the shell from engagement with the molding surface, and subjecting the shell and fluid paste dispersion therein to further heat to convert the remainder of the fluid dispersion to a solid resilient condition firmly bonded to the article, said paste dispersion being a fluid mixture of resin particles and liquid plasticizer in which the resin is not dissolved to a substantial extent when cold but is dissolved when the dispersion is heated.

2. The method of providing a molded tread member of substantial thickness on an article of footwear which comprises bringing together the article and a molding surface to provide between the article and the molding surface a confined space defining the shape of the desired tread member, supplying to the space a body of a fluid paste dispersion of resin particles, supplying heat to said body through said molding surface, maintaining the article and dispersion in contact with said molding surface to solidify the portion of the dispersion adjacent the molding surface to a depth such that it forms a shape-retaining shell confining unsolidified portions of the dispersion against the surface of the article and the solidified material of the shell bonds itself firmly to the portions of the article adjacent the molding surface, removing the article together with the adhering solidified shell and unsolidified dispersion within the shell from engagement with the molding surface, and subjecting the shell and fluid paste dispersion therein to further heat to convert the remainder of the fluid dispersion to a solid resilient condition firmly bonded to the article, said paste dispersion being a fluid mixture of resin particles and a liquid plasticizer in which the resin is not dissolved to a substantial extent when cold but is dissolved when the dispersion is heated.

3. The method of providing a molded tread member of substantial thickness on an article of footwear which comprises bringing together the article and a molding surface to provide between the article and the molding surface a confined space defining the shape of the desired tread member, supplying to the space a body of a fluid paste dispersion of resin particles, supplying heat to said body through said molding surface, maintaining the article and dispersion in contact with said heated molding surface to convert the portions of the dispersion adjacent the molding surface to a thickness such that it forms a shape-retaining shell confining unsolidified portions of the dispersion against the surface of the article and the solidified material of the shell bonds itself firmly to the portions of the article adjacent the molding surface, removing the article together with the adhering solidified shell and unsolidified dispersion within the shell from engagement with the molding surface, and subjecting the shell and fluid paste dispersion therein to heating by radiation to convert the remainder of the fluid dispersion to a solid resilient condition firmly bonded to the article, said paste dispersion being a fluid mixture of resin particles and a liquid plasticizer in which the resin is not dissolved to a substantial extent when cold but is dissolved when the dispersion is heated.

4. The method of providing a molded member of substantial thickness on an article which comprises bringing together the article and a molding surface to provide between the article and the molding surface a confined space of the shape of the desired member, supplying to the space a body of a fluid paste dispersion of resin particles, supplying heat to the molding surface to solidify the portion of the dispersion adjacent the molding surface to a depth such that it forms a shape-retaining shell confining the unsolidified portion of the dispersion against the surface of the article and the solidified material of the shell bonds itself firmly to portions of the article adjacent the molding surface, removing the article together with the adhering solidified shell and unsolidified dispersion within the shell from engagement with the molding surface, subjecting the shell and fluid paste dispersion therein to heat to convert the fluid dispersion to a solid resilient condition firmly bonded to the article, and pressing the solidified dispersion while in heated condition against a forming surface to provide a desired surface on the solidified resin dispersion, said paste dispersion being a fluid mixture of resin particles and liquid plasticizer in which the resin is not dissolved to a substantial extent when cold but is dissolved when the dispersion is heated.

5. The method of providing a molded tread member of substantial thickness on an article of footwear which comprises bringing together the article and a molding surface to provide between the article and the molding surface a confined space of the shape of the desired tread member, supplying to the space a body of a fluid paste dispersion of resin particles, supplying heat to the molding surface to solidify the portions of the dispersion adjacent the molding surface to a thickness such that it forms a shape-retaining shell confining the unsolidified portion of the dispersion against the surface of the article and the solidified material of the shell bonds itself firmly to the portions of the article adjacent the molding surface, removing the article together with the adhering solidified shell and unsolidified dispersion within the shell from engagement with the molding surface, subjecting the shell and fluid paste dispersion therein to heat to convert the fluid dispersion to a solid resilient condition firmly bonded to the article, and pressing the solidified dispersion while in heated condition against a forming surface to provide a desired tread surface on the solidified resin dispersion, said paste dispersion being a fluid mixture of resin particles and liquid plasticizer in which the resin is not dissolved to a substantial extent when cold but is dissolved when the dispersion is heated.

6. The method of providing a molded tread member of substantial thickness on an article of footwear which comprises bringing together the article and a molding surface to provide between the article and the molding surface a confined space of the configuration of the desired tread member, supplying to the space a body of a fluid paste dispersion of resin particles, supplying heat to the molding surface to solidify the portion of the dispersion adjacent the molding surface to a thickness such that it forms a shape-retaining shell confining the unsolidified portion of the dispersion against the surface of the article and the solidified material of the shell bonds itself firmly to the portions of the article adjacent the molding surface, removing the article together with the adhering solidified shell and unsolidified dispersion within the shell from engagement with the molding surface, subjecting the shell and fluid paste dispersion therein to heating by radiation to convert the fluid dispersion to a solid resilient condition firmly bonded to the article, and pressing the solidified dispersion while in heated condition against a forming surface to provide a desired tread surface on the solidified resin dispersion, said paste dispersion being a fluid mixture of resin particles and liquid plasticizer in which the resin is not dissolved to a substantial extent when cold but is dissolved when the dispersion is heated.

ANDREW A. ROOT.

References Cited in the file of this patent

UNITED STATES PATENTS

| Number | Name | Date |
|---|---|---|
| 255,139 | Burr | Mar. 21, 1882 |
| 1,691,347 | Gray | Nov. 13, 1928 |
| 1,989,853 | Finn | Feb. 5, 1935 |
| 2,032,508 | Seiberling | Mar. 3, 1936 |
| 2,129,106 | Szerenyi | Sept. 6, 1938 |
| 2,470,089 | Booth | May 17, 1949 |

FOREIGN PATENTS

| Number | Country | Date |
|---|---|---|
| 500,298 | Great Britain | Feb. 7, 1939 |